US011182437B2

(12) United States Patent
Yoshida

(10) Patent No.: US 11,182,437 B2
(45) Date of Patent: \*Nov. 23, 2021

(54) HYBRID PROCESSING OF DISJUNCTIVE AND CONJUNCTIVE CONDITIONS OF A SEARCH QUERY FOR A SIMILARITY SEARCH

(71) Applicant: International Business Machines Corporation, Armonk, NY (US)

(72) Inventor: Issei Yoshida, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 401 days.

This patent is subject to a terminal disclaimer.

(21) Appl. No.: 15/795,071

(22) Filed: Oct. 26, 2017

(65) Prior Publication Data

US 2019/0129952 A1  May 2, 2019

(51) Int. Cl.
*G06F 16/00* (2019.01)
*G06F 16/93* (2019.01)
*G06F 16/33* (2019.01)
*G06F 16/22* (2019.01)
*G06F 16/2457* (2019.01)
*G06F 16/30* (2019.01)

(52) U.S. Cl.
CPC .......... *G06F 16/93* (2019.01); *G06F 16/2255* (2019.01); *G06F 16/24578* (2019.01); *G06F 16/3341* (2019.01)

(58) Field of Classification Search
None
See application file for complete search history.

(56) References Cited

U.S. PATENT DOCUMENTS

| 5,241,648 | A | * | 8/1993 | Cheng ................. G06F 16/2456 |
| 5,806,061 | A | * | 9/1998 | Chaudhuri ............. G06F 16/40 |
| 5,899,986 | A | * | 5/1999 | Ziauddin ............... G06F 16/284 |
| 5,963,940 | A | * | 10/1999 | Liddy ................. G06F 16/3329 |
| 6,381,594 | B1 | * | 4/2002 | Eichstaedt ........... G06F 16/337 |
| 6,542,889 | B1 | * | 4/2003 | Aggarwal ............... G06F 16/36 |
| 6,785,669 | B1 | | 8/2004 | Aggarwal et al. | |

(Continued)

OTHER PUBLICATIONS

Mohan et al. "Single Table Access Using Multiple Indexes: Optimization, Execution, and Concurrency Control Techniques", Data Base Technology Institute, IBM Almaden Research Center, 1990, First Online: Jun. 17, 2005 (Year: 1990).*

(Continued)

*Primary Examiner* — Polina G Peach
(74) *Attorney, Agent, or Firm* — Patterson + Sheridan, LLP

(57) ABSTRACT

Aspects of the invention are configured to perform an operation comprising receiving a query specifying an AND condition and an OR condition, determining, based on an AND index structure, a set of documents, of a plurality of documents in a corpus, satisfying the AND condition of the query, computing a query similarity score for a first document in the set of documents, wherein the query similarity score is based on a first hash value computed for the OR condition of the query, a weight value for the OR condition, and a second hash value for the first document specified in an OR index, and returning an indication of the first document and the query similarity score as responsive to the query.

11 Claims, 7 Drawing Sheets

(56) References Cited

U.S. PATENT DOCUMENTS

| | | | |
|---|---|---|---|
| 7,315,852 B2* | 1/2008 | Balmin | G06F 16/24539 707/715 |
| 7,475,064 B2* | 1/2009 | Santosuosso | G06F 16/24558 |
| 7,725,448 B2* | 5/2010 | Beavin | G06F 16/24537 707/705 |
| 7,991,771 B2* | 8/2011 | Beyer | G06F 16/3338 707/728 |
| 8,166,021 B1* | 4/2012 | Cao | G06F 40/289 707/713 |
| 8,190,613 B2* | 5/2012 | Takuma | G06F 16/313 707/741 |
| 9,092,484 B1* | 7/2015 | Abraham | G06F 16/24542 |
| 9,311,403 B1* | 4/2016 | Ioffe | G06F 16/5838 |
| 9,317,556 B2 | 4/2016 | Kirk et al. | |
| 9,811,557 B2* | 11/2017 | Wei | G06F 16/2453 |
| 10,740,328 B2* | 8/2020 | Ding | G06F 16/2455 |
| 2003/0003634 A1 | 1/2003 | Lowrey et al. | |
| 2003/0158842 A1* | 8/2003 | Levy | G06F 16/24532 |
| 2004/0044662 A1* | 3/2004 | Ganesan | G06F 16/24542 |
| 2006/0031195 A1 | 2/2006 | Patterson | |
| 2007/0130188 A1* | 6/2007 | Moon | G06F 21/64 |
| 2009/0228514 A1* | 9/2009 | Liu | G06F 16/8365 |
| 2010/0121838 A1 | 5/2010 | Tankovich et al. | |
| 2012/0322223 A1 | 12/2012 | Oh et al. | |
| 2013/0018916 A1* | 1/2013 | Busch | G06F 16/319 707/771 |
| 2013/0031059 A1* | 1/2013 | Ravikumar | G06F 16/325 707/667 |
| 2014/0181071 A1* | 6/2014 | Pidduck | G06F 16/328 707/711 |
| 2015/0041747 A1 | 2/2015 | Kim | |
| 2015/0193486 A1 | 7/2015 | Moataz et al. | |
| 2015/0213112 A1* | 7/2015 | Malewicz | G06F 16/24545 707/737 |
| 2015/0310005 A1* | 10/2015 | Ryger | G06F 16/3334 707/706 |
| 2016/0092597 A1* | 3/2016 | Hu | G06F 16/9014 707/798 |
| 2016/0188619 A1* | 6/2016 | Su | G06F 16/3322 707/728 |
| 2016/0307113 A1* | 10/2016 | Calapodescu | G06F 16/285 |
| 2017/0068732 A1* | 3/2017 | Newman | G06F 16/24542 |
| 2017/0161375 A1* | 6/2017 | Stoica | G06F 16/353 |
| 2017/0222141 A1 | 8/2017 | BrightSky et al. | |
| 2017/0286544 A1* | 10/2017 | Hunt | H04L 63/0876 |
| 2018/0121820 A1* | 5/2018 | Manasse | G06F 17/18 |
| 2018/0349362 A1 | 12/2018 | Sharp et al. | |

OTHER PUBLICATIONS

Mayank Bawa, Tyson Condie, Prasanna Ganesan "LSH Forest: SelfTuning Indexes for Similarity Search", 2005, ACM (Year: 2005).*

Qin Lv et al. "MultiProbe LSH: Efficient Indexing for HighDimensional Similarity Search", 2007 VLDB Endowment, ACM (Year: 2007).*

Marcus Fontoura et al. "Efficiently Evaluating Complex Boolean Expressions", 2010 ACM (Year: 2010).*

"Locality-sensitive hashing," Wikipedia [Accessed online Sep. 20, 2017].

MinHash, Wikipedia [Accessed online Sep. 20, 2017].

Apache Lucene [Accessed online Sep. 20, 2017].

Suthee Chaidaroon and Yi Fang, "Variational Deep Semantic Hashing for Text Documents," SIGIR 2017, DOI: http://dx.doi.org/10-1145/3077136.3080816.

"Learning to Rank," Wikipedia [Accessed online Sep. 20, 2017].

PCT Notificiation of Transmittal of the International Search Report and the Written Opinion of the International Searching Authority, or the Declaration for Application No. PCT/IB2018/058468 dated Feb. 26, 2019.

Examination Report for Application No. GB2007198.1 dated Jun. 8, 2020.

Bawa et al. "LSH Forest: SelfTuning Indexes for Similarity Search", 2005, ACM (Year: 2005).

* cited by examiner

HYBRID PROCESSING OF DISJUNCTIVE AND CONJUNCTIVE CONDITIONS OF A SEARCH QUERY FOR A SIMILARITY SEARCH

BACKGROUND

The present invention relates to query processing, and more specifically, to hybrid processing of disjunctive and conjunctive conditions of a query for a similarity search.

Search queries often include large numbers of conditions. The types of conditions may include conjunctive conditions (e.g., "cat AND dog") and disjunctive conditions (e.g., "apple OR orange"). Conventional technologies for processing search queries are often optimized for one type of query condition. For example, data structures that can efficiently process conjunctive conditions are not efficient at processing disjunctive conditions. Furthermore, by their nature, data structures that efficiently process disjunctive conditions are unable to process conjunctive conditions in an accurate way. As query conditions can number into the hundreds, thousands, or more, conventional techniques are unable to efficiently process queries including both types of conditions.

SUMMARY

In one embodiment, a system comprises a processor and a memory containing a program which when executed by the processor performs an operation comprising receiving a query specifying an AND condition and an OR condition, determining, based on an AND index structure, a set of documents, of a plurality of documents in a corpus, satisfying the AND condition of the query, computing a query similarity score for a first document in the set of documents, wherein the query similarity score is based on a first hash value computed for the OR condition of the query, a weight value for the OR condition, and a second hash value for the first document specified in an OR index, and returning an indication of the first document and the query similarity score as responsive to the query.

In another embodiment, a non-transitory computer readable medium stores instructions, which, when executed by a processor, performs an operation comprising receiving a query specifying an AND condition and an OR condition, determining, based on an AND index structure, a set of documents, of a plurality of documents in a corpus, satisfying the AND condition of the query, computing a query similarity score for a first document in the set of documents, wherein the query similarity score is based on a first hash value computed for the OR condition of the query, a weight value for the OR condition, and a second hash value for the first document specified in an OR index, and returning an indication of the first document and the query similarity score as responsive to the query.

DETAILED DESCRIPTION

Embodiments disclosed herein provide techniques to efficiently process conjunctive conditions (also referred to as "AND conditions") and disjunctive conditions (also referred to as "OR conditions") in queries. Generally, a first type of index structure is used to process the AND conditions of a received query, while hashing techniques are separately used to process the OR conditions of the query. The results of processing the AND conditions and the OR conditions may then be merged to compute the final search result set. The final search result set includes results which fully satisfy every AND condition in specified the query, and the results in the result set are sorted by the degree to which the OR conditions of the query are satisfied by a given result.

Figure 1:
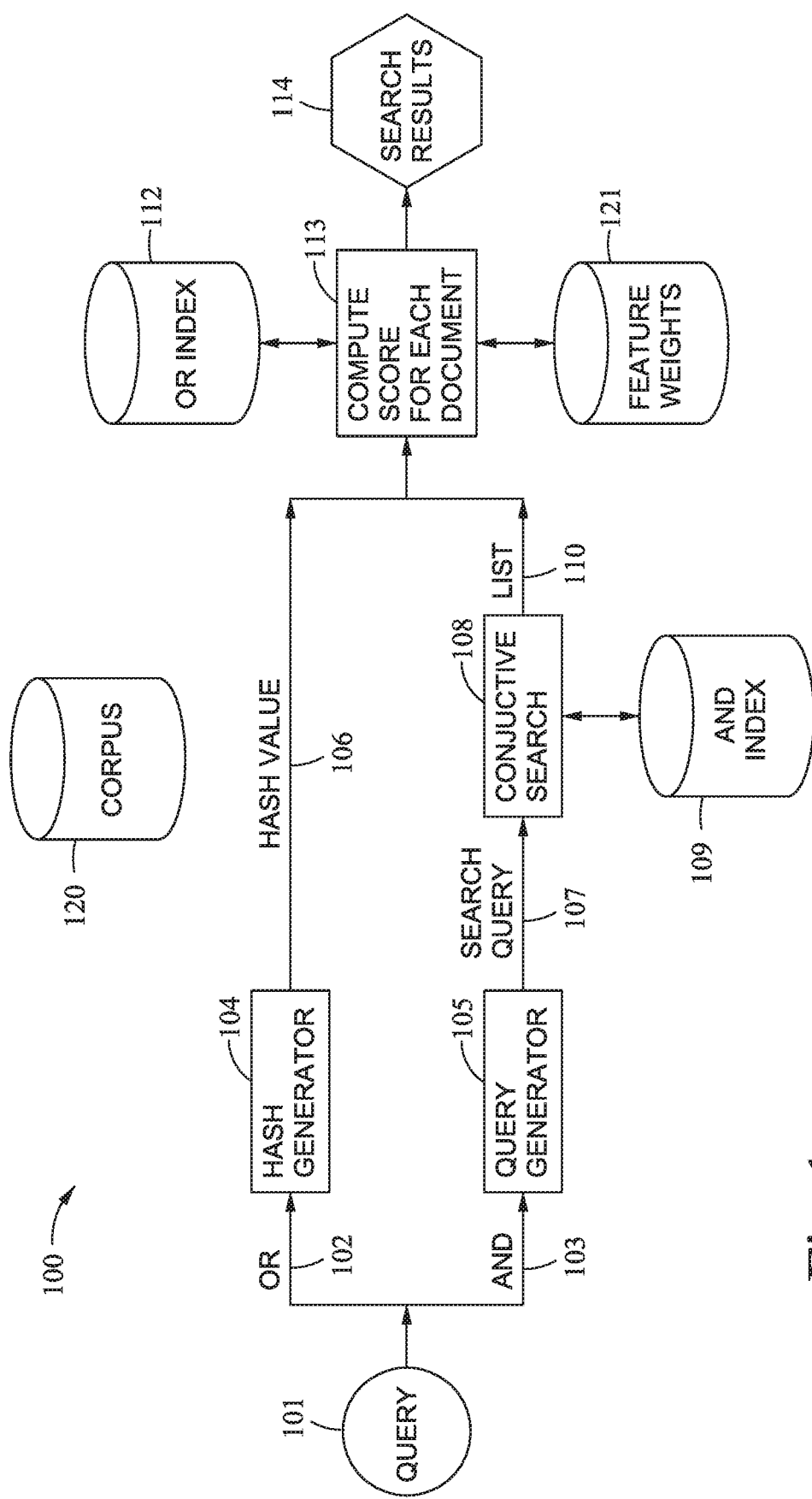
FIG. 1 illustrates a query processing system which implements hybrid processing of disjunctive and conjunctive conditions of a search query for a similarity search, according to one embodiment.

FIG. 1 illustrates a query processing system 100 which implements hybrid processing of disjunctive and conjunctive conditions of a search query for a similarity search, according to one embodiment. As shown, the query processing system 100 receives a query 101. The query 101 may be received from any type of interface, such as a command line interface, graphical user interface, application interface, and the like. Generally, the query 101 targets a collection of documents stored in the corpus 120. The documents stored in the corpus 120 may include metadata attributes, such as "author", "place", "publication date:", "topics", etc., as well as corresponding values for each metadata attribute. The documents stored in the corpus 120 may be identified by a unique document identifier (ID). The query 101 may specify to search for documents in the corpus 120 matching certain metadata attributes (also referred to as "features"). For example, the query 101 may specify to return documents having an author of "Socrates AND Aristotle", a place of "Greece OR Athens", and a topic of "philosophy OR trial". The syntax of the query 101 may be of any syntax, presently known or unknown.

To process the query 101, the query processing system 100 parses the query 101 into a set of OR conditions 102 and a set of AND conditions 103. The OR conditions 102 correspond to any disjunctive "OR" conditions in the query, such as "Greece OR Athens" in the above example query. The AND conditions 103 correspond to any conjunctive "AND" conditions in the query, such as "Socrates AND Aristotle" in the above example query. To process the AND conditions 103, a query generator 105 generates a search query (or queries) 107. The search query 107 is representative of one or more search queries including each AND condition 103 specified in the query 101. The search query 107 is processed in a conjunctive search 108, which leverages an AND index 109. The AND index 109 is generated during a preprocessing phase of the documents in the corpus 120, and is an index structure that is used to efficiently return documents in the corpus 120 satisfying the AND conditions 103. In one embodiment, the AND index 109 is a set of Lucene® posting lists. Generally, the AND index 109 stores an indication of each of a plurality of metadata attributes (e.g., "author:Socrates"), and an indication (e.g., the document ID) of each document in the corpus 120 that includes a matching metadata attribute. For example, during the preprocessing phase, the query processing system 100 may determine that documents having example IDs of "1", "200", and "1337" include metadata attributes specifying the author of the documents was Socrates. Therefore, the AND index 109 would include an indication of "author: Socrates" and the document IDs of "1" "200", and "1337". In at least one embodiment, the entries in the AND index 109 are sorted in ascending order of document IDs for a given metadata attribute.

Therefore, the result of the conjunctive search 108 of the AND index 109 returns a list 110 (or set) of documents in the corpus 120 satisfying each AND condition 103 in the query 101. For example, the list 110 may specify document IDs "1" and "1337" as the documents having an author value of "Socrates" and "Aristotle" (assuming document IDs "1" and "1337" are associated with "Aristotle" in the AND index 109).

To process the OR conditions 102, the query processing system 100 leverages a hash generator 104 to compute one or more hash values 106. The hash generator 104 is representative of any locality-sensitive hashing (LSH) function which takes a set of attributes (or features) as input and computes a hash value based on the input. Generally, the hash generator 104 is configured to generate hash values such that similar input (e.g., similar set of attributes) maps to the same (or nearby) hash values. Doing so allows two or more documents from the corpus 120 to be compared based on the computed hash values. Generally, the hash generator 104 computes a respective hash value "h(x)" (where "x" is an OR condition) 106 for each OR condition 102 in the query 101, and a hash value "h(O)" (where "O" is the set of all OR conditions in the query 101) 106 based on each of the OR conditions 102 in the query 101. Therefore, continuing with the previous example query 101, the hash generator 104 would compute a first hash value 106 for "Greece", a hash second value 106 for "Athens", a third hash value 106 for "philosophy", a fourth hash value 106 for "trial", and a fifth hash value 106 for "Greece Athens philosophy trial" (note that the spaces may or may not be included when computing the fifth hash value; similarly, other delimiters may or may not be included to separate the words of each OR condition).

At block 113, the query processing system 100 computes one or more scores for each document in the document list 110 (e.g., the set of documents satisfying each AND condition 103 of the query 101). To do so, the query processing system 100 leverages the OR index 112, which is also generated during a preprocessing phase of the corpus 120. Generally, the OR index 112 is an array of hash values "h(d)" (where "d" is a document) computed by the hash generator 104 for each document in the corpus 120 (e.g., the set of the features of each document in the corpus 120 is the input to the hash generator 104). The OR index 112 further includes a respective document ID for each document in the corpus 120, which is associated with the respective hash value h(d) generated by the hash generator 104. In at least one embodiment, the OR index 112 is sorted in ascending order of the document IDs.

The query processing system 101 then executes a loop for each document stored in the OR index 112. Generally, in a given iteration of the loop, if the current document ID is not included in the document list 110, the query processing system skips the current document, as the document did not satisfy each AND condition 103 of the query. Otherwise, the query processing system 100 initializes a query similarity score "s(Q,d)" for the query relative to the current document (e.g., sets the score s(Q,d) to zero, where "Q" is the query 101, and "d" is the current document). The query processing system 100 then computes an overall OR similarity score "s(O,d)" (where "O" is all of the OR conditions 102 and "d" is the current document) between the current document and the OR conditions 102 of the query 101. Generally, the query processing system computes the overall OR similarity score s(O,d) based on the hash value for the current document (e.g., h(d) retrieved from the OR index 112) and the hash value 106 computed for all combined OR conditions in the query 101 (e.g., h(O), the fifth hash value 106 from the example above). In at least one embodiment, the query processing system 100 computes the overall OR similarity score s(O,d) using a Jaccard similarity coefficient of the hash values h(O), h(d). The query processing system 100 then sets the overall OR similarity score s(O,d) for the current document as the query similarity score s(Q,d) for the query relative to the current document. The query processing system 100 then executes a loop for each OR condition 102 in the query 101. Generally, for each OR condition 102, the query processing system 100 computes a score s(d,x) (where "d" is the current document, and "x" is the current OR condition) reflecting the similarity of a document to the current OR condition. In at least one embodiment, the score s(d,x) is computed using the Jaccard similarity coefficient applied to the hash value h(d) for the current document (retrieved from the OR index 112) and the hash value 106 h(x) computed for the current OR condition. If the score s(d,x) is greater than a predefined threshold (e.g., 0), it is likely that the text of the current document satisfies the current OR condition (e.g., includes the current feature, such as author, place, etc.), and the query processing system 100 adds a weight value w(x) (where "x" is an OR condition) for the current OR condition to the query similarity score s(Q,d), e.g., s(Q,d)=s(Q,d)+w(x). The weight values are stored in the feature weights 121. Generally, the feature weights 121 stores a floating point numerical value for each of a plurality of different features (also referred to as metadata attributes and/or conditions), such as author, place, title, etc. In at least one embodiment, the feature weights 121 are predefined and/or generated using a machine learning algorithm. Once each OR condition has been processed, the query similarity score s(Q,d) is returned as the similarity score for the current document, reflecting the degree to which the current document is similar to the search query 101. In at least one embodiment, the query processing system 100 returns the query similarity score s(Q,d) with an indication of the document as a search result 114 responsive to the query 101. In some embodiments, the query processing system 100 maintains a list of the highest query similarity scores s(Q,d) and corresponding document, and returns the list as the search results 114 responsive to the query 101. The size of the list may be of any predefined size (e.g., 10, 20, 100, etc.).

Figure 2:
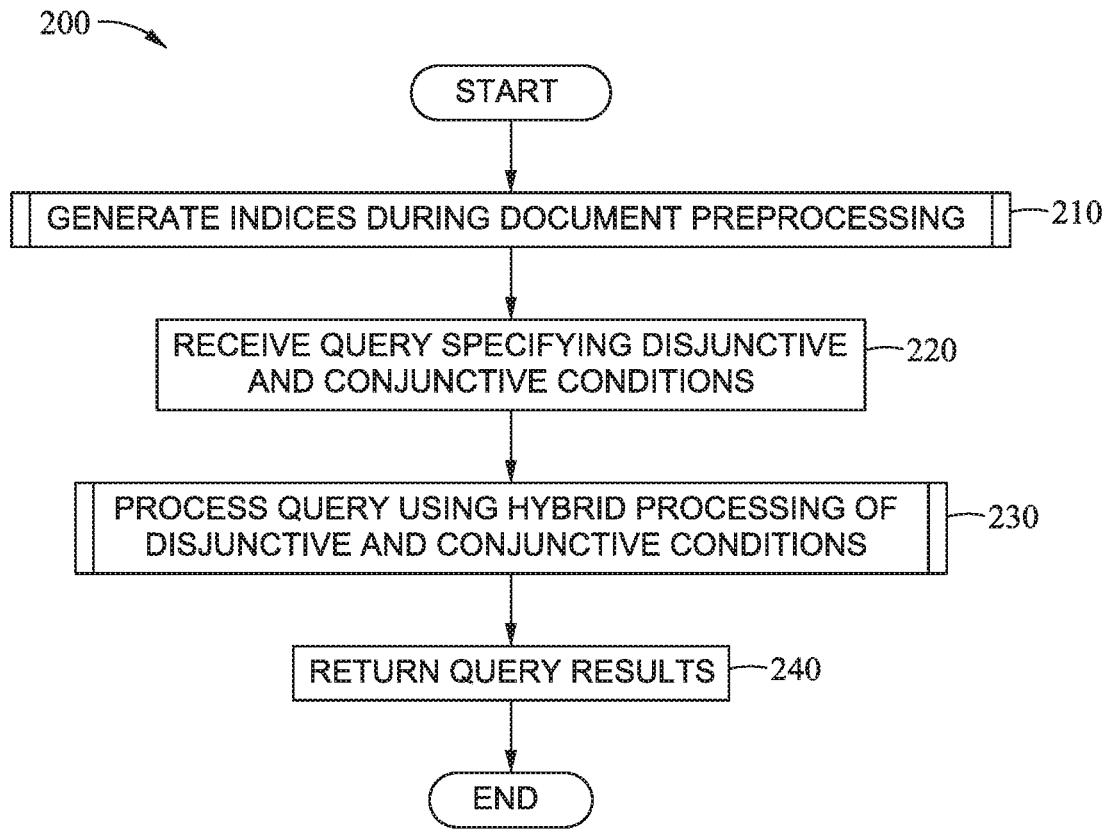
FIG. 2 is a flow chart illustrating a method for hybrid processing of disjunctive and conjunctive conditions of a search query for a similarity search, according to one embodiment.

FIG. 2 is a flow chart illustrating a method 200 for hybrid processing of disjunctive and conjunctive conditions of a search query for a similarity search, according to one embodiment. As shown, the method 200 begins at block 210, described in greater detail with reference to FIG. 3, where the query processing system 100 generates the AND index 109 and the OR index 112 during a preprocessing phase of the documents of the corpus 120. In addition, the preprocessing phase may also include updating the weights in the feature weights 121. At block 220, the query processing system 100 receives a query specifying to return documents from the corpus 120 having at least one conjunctive condition and at least one conjunctive condition. For example, the query may specify the conjunctive conditions "author:Alice AND place:Tokyo", indicating that any matching documents from the corpus 120 must be authored by the example author of "Alice", and have a place attribute (e.g., city of publication, setting, author location, etc.) matching the city of Tokyo. The query may also specify a conjunctive condition such as "topic:orange OR topic:apple", specifying to return documents from the corpus 120 that include oranges or apples as a topic (or generally mention the terms "orange" or "apple").

At block 230, the query processing system 100 processes the query using the hybrid approach described above with reference to FIG. 1. Generally, at block 230, the query processing system 100 processes AND conditions using the AND index 109 to return a list (or set) of documents 110 from the corpus 120 satisfying each AND condition in the query. In parallel, the query processing system 100 processes the OR conditions by computing hash values for each of the OR conditions in the query, and a hash value for the combined OR conditions in the query. The query processing system 100 then computes a query similarity score for each document in the OR index 112 that is also in the list of documents 110 that satisfy each AND condition. The query similarity score for each document is weighted based on the similarity of the document relative to each OR condition specified in the query, where the weights are defined in the feature weights 121. At block 240, the query processing system 100 returns a set of documents from the corpus 120 as being responsive to the query. For example, the query processing system 100 may generate a graphical user interface (GUI) which includes a set of documents and the corresponding query similarity scores. In at least one embodiment, the GUI includes a predefined number of documents from the corpus 120 having the highest query similarity scores.

Figure 3:
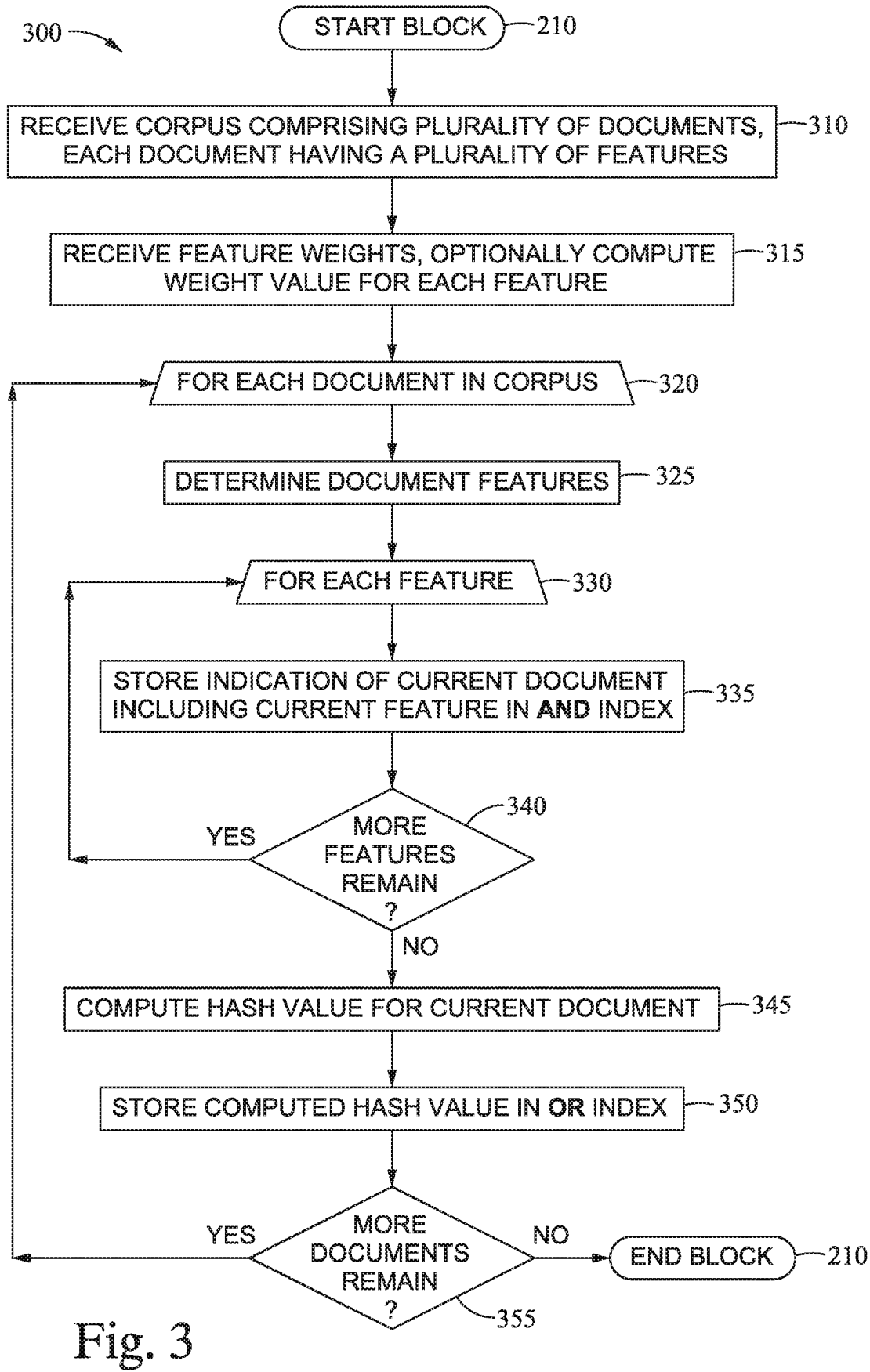
FIG. 3 is a flow chart illustrating a method for document preprocessing, according to one embodiment.

FIG. 3 is a flow chart illustrating a method 300 corresponding to block 210 for document preprocessing, according to one embodiment. As shown, the method 300 begins at block 310, where the corpus 120 comprising a plurality of documents is received by the query processing system 100. Each document in the corpus 120 may include a plurality of features, or attributes, which describe the document. For example, the features may include without limitation, an author, publication date, city of publication, topics, keywords, etc., of the document. At block 315, the query processing system 100 receives the feature weights 121, and optionally computes updated feature weight values for each of the features in the feature weights 121. In at least one embodiment, the updated feature weight values in the feature weights 121 are updated using machine learning algorithms. Generally, the weights in the feature weights 121 reflect weights applied to different features (e.g., author, city, date, etc.) based on the relative importance and/or frequency of each feature in the documents in the corpus 120. For example, if machine learning determines that author name is the most important feature when computing query similarity scores, the feature weight 121 for author name may have the greatest weight relative to other features in the feature weights 121.

At block 320, the query processing system 100 executes a loop including blocks 325-355 for each document in the corpus 120. At block 325, the query processing system 100 determines the features of the current document. The query processing system 100 may determine the features based on the metadata associated with the current document. Additionally, the query processing system 100 may apply natural language processing to the text of the document extract additional features (or attributes) from the document. At block 330, the query processing system 100 executes a loop including blocks 335-340 for each feature of the current document identified at block 325. At block 335, the query processing system 100 stores an indication in the AND index 109 reflecting that the current document includes the current feature. Generally, the AND index 109 includes an indication of the current feature, and a list of document IDs including the respective feature. The list of document IDs in the AND index 109 may be sorted in ascending order of document ID. At block 340, the query processing system 100 determines whether more features remain in the current document. If more features remain, the query processing system 100 returns to block 330, otherwise, the query processing system 100 proceeds to block 345.

At block 345, the query processing system 100 invokes the hash generator 104 to compute a hash value 106 (also referred to as "h(d)") for the current document. As previously stated, the hash generator 104 applies a locality-sensitive hashing function to the set of the features of the document to compute the hash value 106 for the document. At block 350, the query processing system 100 stores the computed hash value 106 along with the current document ID in the OR index 112. In at least one embodiment, the query processing system 100 orders the OR index 112 in ascending order of document ID. At block 355, the query processing system 100 determines whether more documents remain in the corpus 120. If more documents remain, the query processing system 100 returns to block 320 to preprocess the remaining documents. Otherwise, the method 300 ends.

Figure 4:
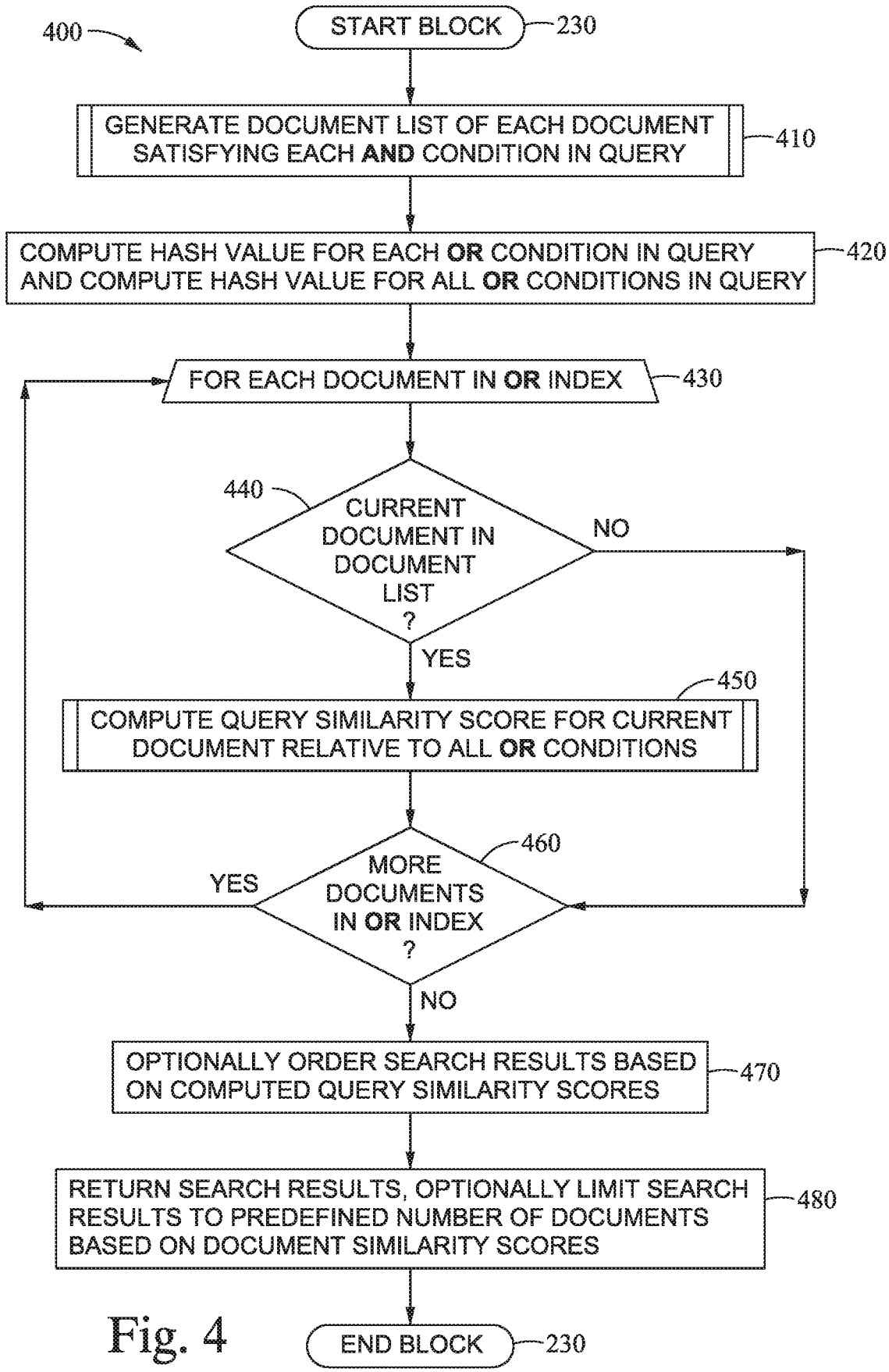
FIG. 4 is a flow chart illustrating a method to process a query using hybrid processing of disjunctive and conjunctive conditions, according to one embodiment.

FIG. 4 is a flow chart illustrating a method 400 corresponding to block 230 to process a query using hybrid processing of disjunctive and conjunctive conditions, according to one embodiment. As shown, the method 400 begins at block 410, described in greater detail with reference to FIG. 5, where the query processing system 100 generates a document list 110 of each document satisfying each AND condition in the query. Generally, the query processing system 100 leverages the AND index 109 to determine which documents in the corpus 120 satisfy each AND condition in the query. If the document ID is associated with a given feature in the AND index 109, the query processing system 100 determines that the respective AND condition is satisfied. At block 420, the query processing system 100 invokes the hash generator 104 to compute a hash value "h(x)" for each OR condition in the query, where "x" is a given OR condition (e.g., "place:Japan"). The hash generator 104 also computes a hash value "h(O)" for all of the OR conditions in the query, e.g., a hash of ("place:Japan title:oranges keyword:fruit").

At block 430, the query processing system 100 executes a loop including blocks 440-460 for each document in the OR index 112. At block 440, the query processing system 100 determines whether the document ID of the current document is included in the document list 110 of documents satisfying each AND condition generated at block 410. If the current document is not in the document list 110, the document does not satisfy each AND condition of the query, and the query processing system 100 proceeds to block 460 (e.g., discards the current document as a possible search result). Otherwise, the query processing system 100 proceeds to block 450, where the query processing system 100 computes a query similarity score s(Q,d) for the current document, which reflects the degree to which the current document satisfies the OR conditions of the query.

At block 460, the query processing system 100 determines whether more documents remain in the OR index 112. If more documents remain, the query processing system 100 returns to block 430. Otherwise, the query processing system 100 proceeds to block 470, where the query processing system 100 optionally orders the search results based on the query similarity scores computed at block 450. Since a query similarity score is computed only those documents satisfying each AND condition at block 450, doing so orders the results based on the degree to which each document satisfies each OR condition in the query. At block 480, the query processing system 100 returns the search results as responsive to the query. As previously stated, the query processing system 100 may optionally limit the number of search results returned to a predefined number of results, where only the highest ranking results (based on query similarity score) are returned.

Figure 5:
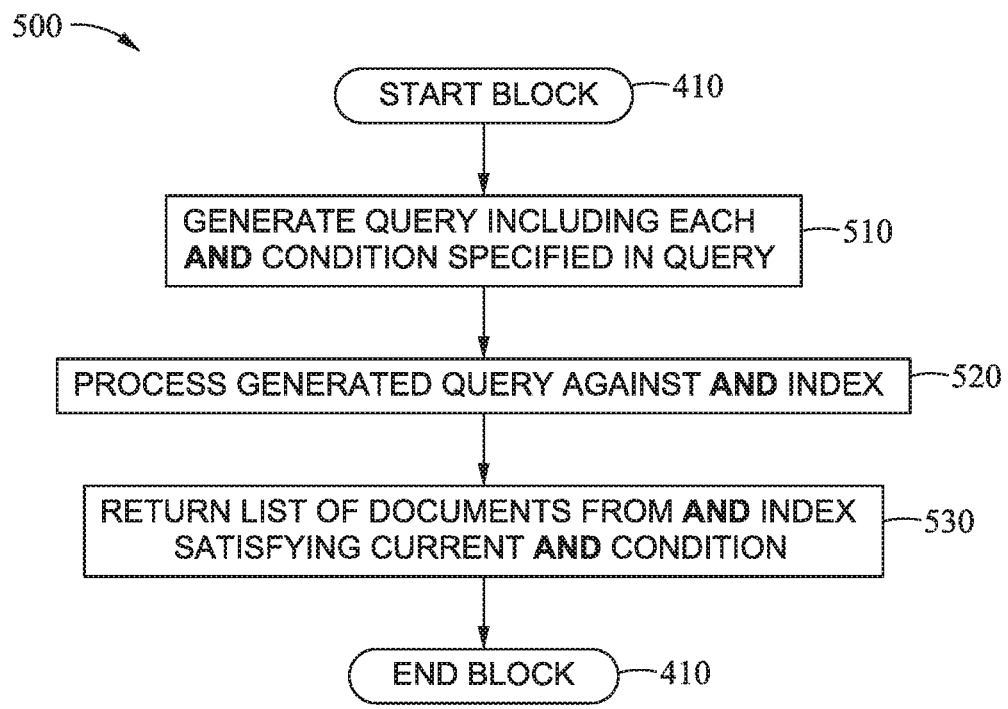
FIG. 5 is a flow chart illustrating a method to generate a document list of each document satisfying each AND condition in a query, according to one embodiment.

FIG. 5 is a flow chart illustrating a method 500 corresponding to block 410 to generate a document list of each document satisfying each AND condition in a query, according to one embodiment. As shown, the method 500 begins at block 510, where the query processing system 100 generates a query including each AND condition specified in the query. For example, if the query included an indication of "author:Smith AND city:New York AND keyword:taxis", the query processing system 100 would generate a query specifying to return document IDs from the AND index 109 that have an author name of "Smith", a city of publication of "New York", and a keyword of "taxis". At block 520, the query processing system 100 processes the query generated at block 520 against the AND index 109. At block 530, the list of documents 110 including each document ID that satisfies each of the AND conditions in the query generated at block 510 is returned from the AND index 109.

Figure 6:
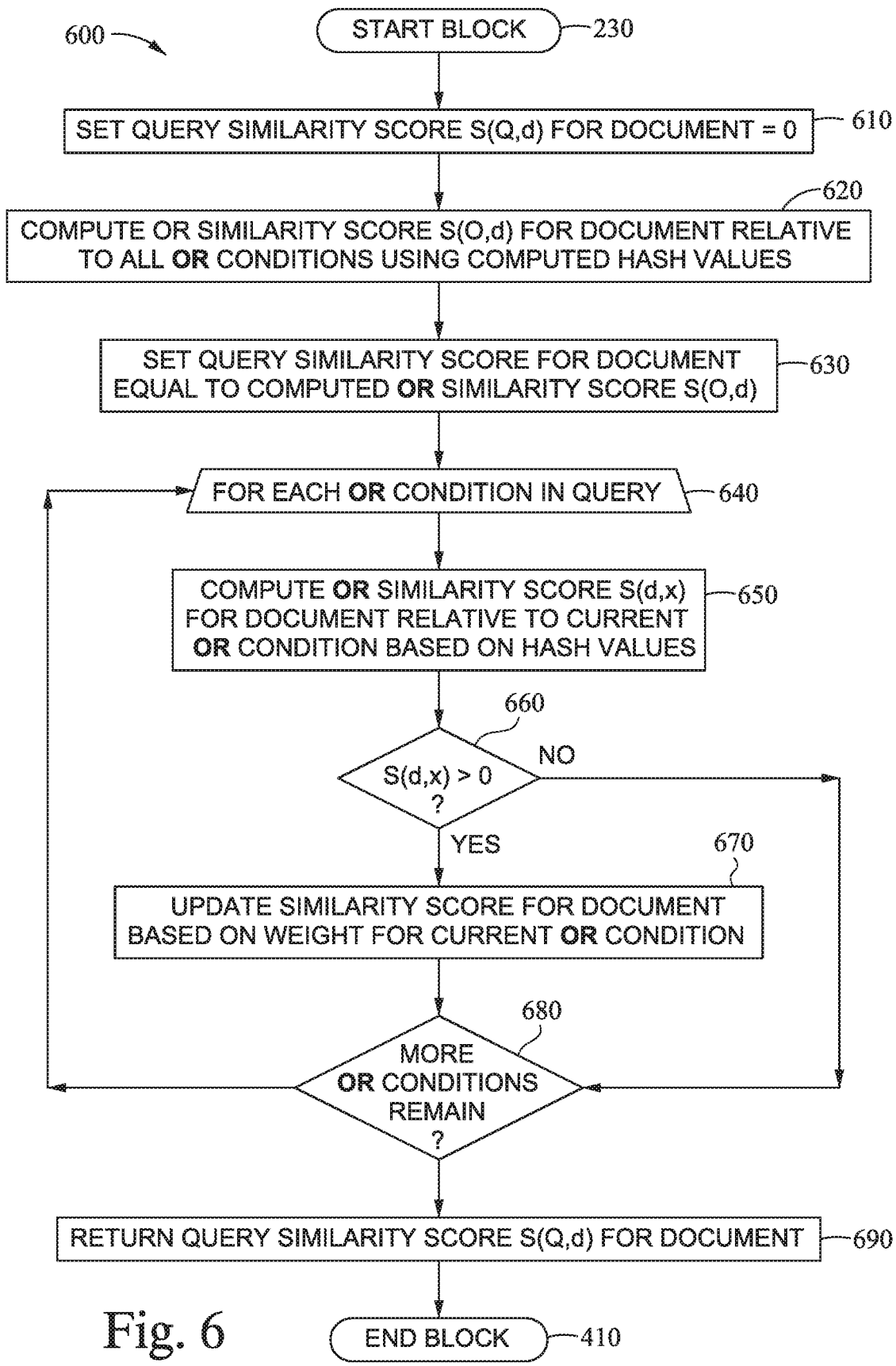
FIG. 6 is a flow chart illustrating a method to compute a similarity score for a document relative to all OR conditions in a query, according to one embodiment.

FIG. 6 is a flow chart illustrating a method 600 corresponding to block 450 to compute a query similarity score for a document relative to all OR conditions in a query, according to one embodiment. As shown, the method 600 begins at block 610, where the query processing system 100 sets the query similarity score S(Q,d) for the current document equal to zero. At block 620, the query processing system 100 computes an overall OR similarity score s(O,d) for the document relative to all of the OR conditions of the query. In one embodiment, the overall OR similarity score s(O,d) is computed based on a Jaccard similarity score based on the hash value h(O) computed at block 420 (for all of the OR conditions in the query) and the hash value h(d) for the document retrieved from the OR index 112 based on the document ID of the document. At block 630, the query processing system 100 sets the query similarity score s(Q,d) for the document equal to the overall OR similarity score s(O,d) computed at block 620, e.g., s(Q,d) =s(O,d).

At block 640, the query processing system 100 executes a loop including blocks 650-680 for each OR condition in the query. At block 650, the query processing system 100 computes an OR similarity score s(d,x) for the document relative to the current OR condition. In at least one embodiment, s(d,x) is computed based on a Jaccard coefficient of the hash value h(d) for the document retrieved from the OR index 112 and the hash value 106 h(x) computed for the current OR condition at block 420. At block 660, the query processing system 100 determines whether the score s(d,x) computed at block 650 is greater than zero. If the score s(d,x) is less than or equal to zero, the query processing system 100 proceeds to block 680, refraining from adding any weight to the query similarity score s(Q,d) based on the current feature, as the score s(d,x) indicates that the document does not satisfy the current OR condition (e.g., the current feature specified by the OR condition is not present in the query). However, if the score s(d,x) is greater than zero, it is likely that the document satisfies the current OR condition (e.g., continuing with the previous example, has an author name of "Smith", or a location of "New York"), and the query processing system 100 proceeds to block 670.

At block 670, the query processing system 100 updates the query similarity score s(Q,d) by adding the weight value from the feature weights 121 for the current OR condition, such that s(Q,d) =s(Q,d) +w(x), where w(x) is the feature weight for the current OR condition in the feature weights. For example, if the current condition relates to the author of a document, w(x) would be the feature weight associated with the "author" in the feature weights 121. At block 680, the query processing system 100 determines whether more OR conditions remain in the query. If so, the query processing system 100 returns to block 640. Otherwise, the query processing system 100 proceeds to block 690, where the query similarity score s(Q,d) is returned for the document. Doing so returns a score that considers the degree to which the document satisfies each OR condition, as well as all OR conditions combined. If the document satisfies a given OR condition, the corresponding weight w(x) from the feature weights 121 is added to the query similarity score s(Q,d) for the document. Similarly, because the OR similarity score s(O,d) is considered at block 620, the degree to which the document satisfies all OR conditions of the query is reflected in the query similarity score s(Q,d).

Figure 7:
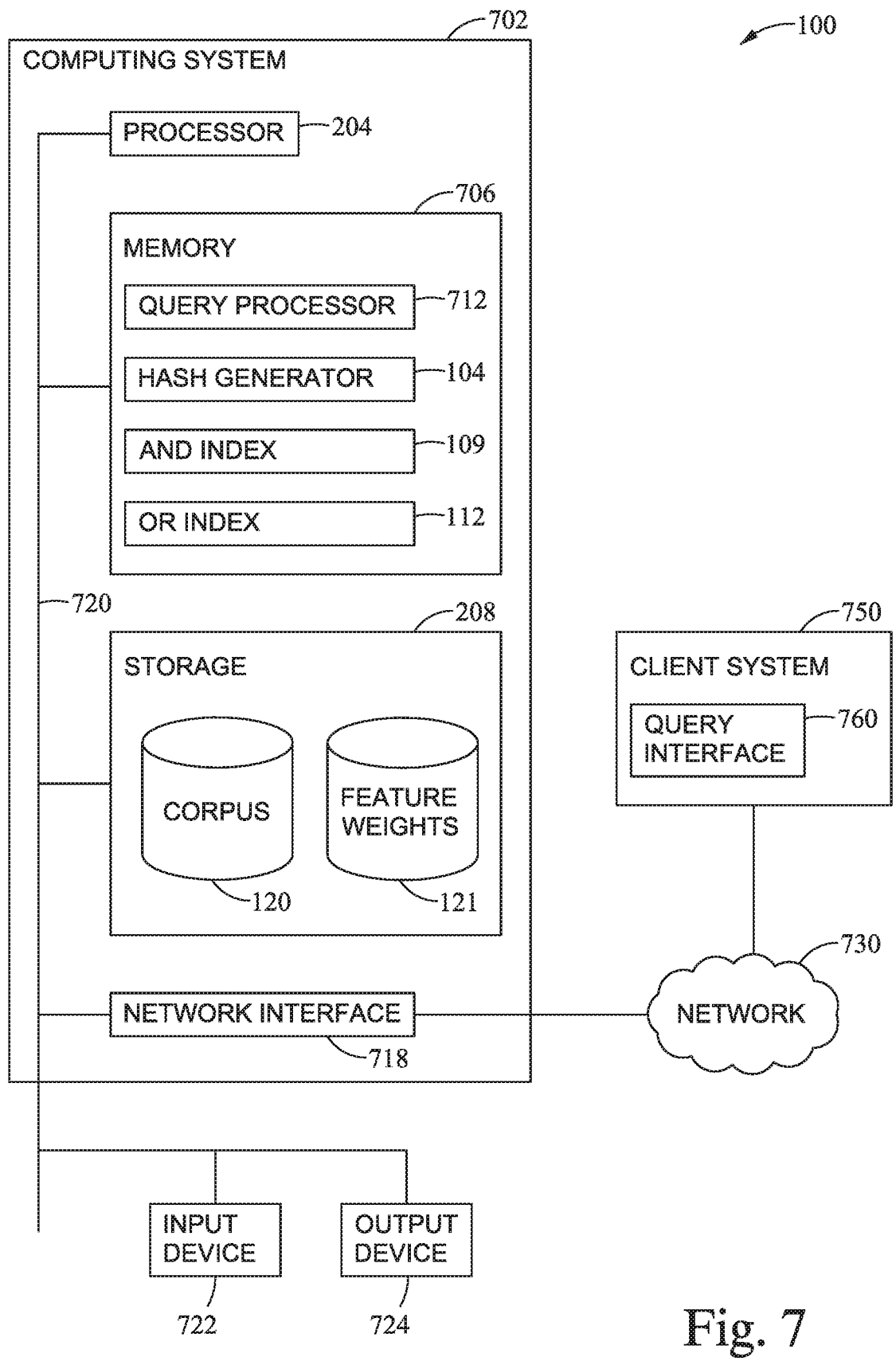
FIG. 7 illustrates a system which implements hybrid processing of disjunctive and conjunctive conditions of a search query for a similarity search, according to one embodiment.

FIG. 7 is a block diagram illustrating the query processing system 100 which implements hybrid processing of disjunctive and conjunctive conditions of a search query for a similarity search, according to one embodiment. The networked system 100 includes a computing system 702. The computing system 702 may also be connected to other computers via a network 730. In general, the network 730 may be a telecommunications network and/or a wide area network (WAN). In a particular embodiment, the network 730 is the Internet.

The computing system 702 generally includes a processor 704 which obtains instructions and data via a bus 720 from a memory 706 and/or a storage 708. The computing system 702 may also include one or more network interface devices 718, input devices 722, and output devices 724 connected to the bus 720. The computing system 702 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 704 is a programmable logic device that performs instruction, logic, and mathematical processing, and may be representative of one or more CPUs. The network interface device 718 may be any type of network communications device allowing the computing system 702 to communicate with other computers via the network 730.

The storage 708 is representative of hard-disk drives, solid state drives, flash memory devices, optical media and the like. Generally, the storage 708 stores application programs and data for use by the computing system 702. In addition, the memory 706 and the storage 708 may be considered to include memory physically located elsewhere; for example, on another computer coupled to the computing system 702 via the bus 720.

The input device 722 may be any device for providing input to the computing system 702. For example, a keyboard and/or a mouse may be used. The input device 722 represents a wide variety of input devices, including keyboards, mice, controllers, and so on. Furthermore, the input device 722 may include a set of buttons, switches or other physical device mechanisms for controlling the computing system 702. The output device 724 may include output devices such as monitors, touch screen displays, and so on.

As shown, the memory 706 contains the query processor 712, which is an application generally configured to process queries received from a query interface 760 of a client computing system 760 using the hybrid approach described herein with reference to the query processing system 100 in FIGS. 1-6. The memory further contains the hash generator 194, the AND index 109, and the OR index 112, each described in greater detail above. As shown, the storage 708 contains the corpus 120 and the feature weights 121, each described in greater detail above. Generally, the query processor 712 and the computing system 702 are configured to implement all functionality described above with reference to FIGS. 1-6.

Advantageously, embodiments disclosed herein provide an effective integration of techniques for efficiently processing queries containing conjunctive and disjunctive conditions. As stated above, embodiments disclosed herein leverages hash values computed for each document to determine whether a corresponding feature exists in the document, drastically reducing the amount of memory that is needed to store all of the features of each document. Similarly, even though a query may include large numbers of AND conditions, processing resources are saved by refraining from computing similarity scores for the OR conditions of those documents that do not satisfy each AND condition.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the query processor 712 could execute on a computing system in the cloud and process queries using a hybrid approach as described above. In such a case, the query processor 712 could generate the AND index 109 and the OR index 112 and store the indices 109, 112 at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A system, comprising:
   a processor; and
   a memory containing a program which when executed by the processor performs an operation comprising:
      receiving a query specifying an AND condition and an OR condition;
      determining, based on an AND index structure, a set of documents, of a plurality of documents in a corpus, satisfying the AND condition of the query;
      computing a query similarity score, based on an OR index, for a first document in the set of documents determined based on the AND index, comprising:
         computing a respective hash value for each respective OR condition of the plurality of OR conditions;
         computing a first hash value for the plurality of OR conditions;
         determining a second hash value for the first document,
      wherein the second hash value is specified in an OR index;
         computing an overall similarity score for the first document relative to the plurality of OR conditions based on the first hash value for the plurality of OR conditions and the second hash value for the first document received from the OR index;

computing a respective OR similarity score for the first document relative to each respective OR condition of the plurality of OR conditions based on the second hash value for the first document received from the OR index and the respective hash value for the respective OR condition; and adding, for each respective OR similarity score exceeding a predefined threshold, a weight associated with the respective OR condition to the overall similarity score; and returning the overall similarity score as the query similarity score; and returning an indication of the first document and the query similarity score as responsive to the query.

2. The system of claim 1, wherein the AND index comprises a posting list configured to store a document identifier (ID) for each document including a respective feature, of a plurality of features, wherein the OR index comprises a respective hash value for each of the plurality of documents, wherein the second hash value and the hash values in the OR index are computed based on a locality-sensitive hashing function.

3. The system of claim 2, wherein the query specifies a plurality of AND conditions, wherein the determined set of documents satisfy each of the plurality of AND conditions, wherein determining the set of documents comprises:

generating a search query including an indication of each of the plurality of AND conditions specified in the query;

processing the search query against the AND index; and receiving, from the AND index, the set of documents comprising the document ID of each document in the set of documents.

4. The system of claim 1, the operation further comprising prior to computing the similarity score for the first document:

receiving a document identifier (ID) for the first document from the OR index; and determining that the document ID for the first document is included in the set of documents.

5. The system of claim 4, the operation further comprising:

receiving a document identifier (ID) for a second document of the plurality of documents in the corpus from the OR index;

determining that the document ID for the second document is not included in the set of documents;

refraining from computing a query similarity score for the second document; and refraining from returning the second document as responsive to the query.

6. The system of claim 1, wherein the AND index and the OR index are generated during a preprocessing phase of the plurality of documents in the corpus.

7. A computer program product, comprising:

a non-transitory computer-readable storage medium having computer-readable program code embodied therewith, the computer-readable program code executable by a processor to perform an operation comprising:

receiving a query specifying an AND condition and an OR condition;

determining, based on an AND index structure, a set of documents, of a plurality of documents in a corpus, satisfying the AND condition of the query;

computing a query similarity score, based on an OR index, for a first document in the set of documents determined based on the AND index, comprising:

computing a respective hash value for each respective OR condition of the plurality of OR conditions;

computing a first hash value for the plurality of OR conditions;

determining a second hash value for the first document, wherein the second hash value is specified in an OR index;

computing an overall similarity score for the first document relative to the plurality of OR conditions based on the first hash value for the plurality of OR conditions and the second hash value for the first document received from the OR index;

computing a respective OR similarity score for the first document relative to each respective OR condition of the plurality of OR conditions based on the second hash value for the first document received from the OR index and the respective hash value for the respective OR condition; and adding, for each respective OR similarity score exceeding a predefined threshold, a weight associated with the respective OR condition to the overall similarity score; and returning the overall similarity score as the query similarity score; and returning an indication of the first document and the query similarity score as responsive to the query.

8. The computer program product of claim 7, wherein the AND index comprises a posting list configured to store a document identifier (ID) for each document including a respective feature, of a plurality of features, wherein the OR index comprises a respective hash value for each of the plurality of documents, wherein the second hash value and the hash values in the OR index are computed based on a locality-sensitive hashing function.

9. The computer program product of claim 8, wherein the query specifies a plurality of AND conditions, wherein the determined set of documents satisfy each of the plurality of AND conditions, wherein determining the set of documents comprises:

generating a search query including an indication of each of the plurality of AND conditions specified in the query;

processing the search query against the AND index; and receiving, from the AND index, the set of documents comprising the document ID of each document in the set of documents.

10. The computer program product of claim 7, the operation further comprising prior to computing the similarity score for the first document:

receiving a document identifier (ID) for the first document from the OR index; and determining that the document ID for the first document is included in the set of documents.

11. The computer program product of claim 10, wherein the AND index and the OR index are generated during a preprocessing phase of the plurality of documents in the corpus, wherein the operation further comprises:

receiving a document identifier (ID) for a second document of the plurality of documents in the corpus from the OR index;

determining that the document ID for the second document is not included in the set of documents;

refraining from computing a query similarity score for the second document; and refraining from returning the second document as responsive to the query.

* * * * *